United States Patent [19]
Bianchini et al.

[11] Patent Number: 5,487,940
[45] Date of Patent: Jan. 30, 1996

[54] OXYGEN AND MOISTURE BARRIER METALLIZED FILM STRUCTURE

[75] Inventors: Eber C. Bianchini, Rochester, N.Y.; Anthony R. Knoerzer, Plano, Tex.; Larry A. Parr, Canandaigua; Leland W. Reid, Palmyra, both of N.Y.

[73] Assignee: Mobil Oil Corp., Fairfax, Va.

[21] Appl. No.: 297,945

[22] Filed: Aug. 31, 1994

Related U.S. Application Data

[63] Continuation-in-part of Ser. No. 80,602, Jun. 24, 1993, Pat. No. 5,380,586, which is a continuation-in-part of Ser. No. 812,493, Dec. 23, 1991, abandoned.

[51] Int. Cl.$^6$ .............................. B32B 27/30; B32B 33/00
[52] U.S. Cl. .................... 428/349; 206/524.6; 206/819; 220/DIG. 14; 428/35.3; 428/35.4; 428/35.9; 428/414; 428/424.2; 428/424.6; 428/461; 428/475.5; 428/475.8; 428/480; 428/483; 428/504; 428/515; 428/516; 428/910
[58] Field of Search .................... 428/349, 461, 428/480, 483, 515, 516, 520, 910, 424.2, 424.6, 475.5, 414, 504, 475.8

[56] References Cited

U.S. PATENT DOCUMENTS

| | | | |
|---|---|---|---|
| 2,130,212 | 9/1938 | Watkins | 260/2 |
| 2,333,796 | 11/1943 | Kenyon et al. | 260/73 |
| 2,362,026 | 12/1941 | Quist . | |
| 2,419,281 | 4/1947 | Noble | 260/90 |
| 2,897,092 | 7/1959 | Miller | 117/47 |
| 2,916,468 | 12/1959 | Yundt | 260/29.6 |
| 3,033,842 | 5/1962 | Holtschmidt | 260/91.3 |
| 3,099,646 | 7/1963 | Scardiglia et al. | 290/91.3 |
| 3,221,079 | 11/1965 | Harris | 260/844 |
| 3,232,916 | 2/1966 | Fogle | 260/91.3 |
| 3,275,575 | 9/1966 | Fogle | 260/2.2 |
| 3,282,729 | 11/1966 | Richardson et al. | 428/516 X |
| 3,294,577 | 12/1966 | Mayer | 117/138.8 |
| 3,518,242 | 6/1970 | Chrisp | 260/91.3 |
| 3,702,844 | 11/1972 | Ofstead | 260/91.3 |
| 3,719,621 | 3/1973 | Vogt et al. | 260/30.4 |
| 3,719,629 | 3/1973 | Martine t al. | 260/33.2 |
| 4,055,698 | 10/1977 | Beery | 428/262 |
| 4,154,912 | 5/1979 | Philipp et al. | 526/7 |
| 4,214,039 | 7/1980 | Steiner et al. | 428/414 |
| 4,224,262 | 9/1980 | Baird, Jr. et al. | 264/22 |
| 4,235,365 | 11/1980 | Yoshii et al. | 229/55 |
| 4,240,993 | 12/1980 | Sun | 264/22 |
| 4,254,169 | 3/1981 | Schroeder | 428/35 |
| 4,254,170 | 3/1981 | Roullet et al. | 428/38 |
| 4,272,470 | 6/1981 | Hsu et al. | 264/104 |
| 4,275,119 | 6/1981 | Weiner | 428/516 |
| 4,276,330 | 6/1981 | Stanley et al. | 428/35 |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |
| 4,345,005 | 8/1982 | All et al. | 428/461 |

(List continued on next page.)

FOREIGN PATENT DOCUMENTS

0254468A2  1/1988  European Pat. Off. .

OTHER PUBLICATIONS

R. L. Davidson, "Handbook of Water–Soluble Gums and Resins," *McGraw–Hill Book Company*, Chapter 20, pp. 20-3 to 20-32 (1980).

I. Skeist, "Handbook of Adhesives," Third Edition, *Van Nostrand Reinhold*, Chapter 22, pp. 401–407 (1990).

*Primary Examiner*—James C. Cannon
*Attorney, Agent, or Firm*—Alexander J. McKillop; Dennis P. Santini

[57] ABSTRACT

A polymeric film structure having improved oxygen and moisture barrier characteristics is disclosed. The structure includes a polymeric substrate adapted to receive an oxygen barrier on one side thereof and a moisture barrier on the other side of the oxygen barrier. The oxygen barrier includes polyvinyl alcohol cross-linked with aldehyde containing cross-linking agents in the presence of a catalytic amount of an inorganic acid, preferably sulfuric acid. The moisture barrier is a metallized polymeric composite, preferably metallized oriented polypropylene.

17 Claims, 1 Drawing Sheet

U.S. PATENT DOCUMENTS

| | | | |
|---|---|---|---|
| 4,357,402 | 11/1982 | Sheibley et al. | 429/206 |
| 4,363,840 | 12/1982 | Roullet et al. | 428/35 |
| 4,376,183 | 3/1983 | Haskell | 524/417 |
| 4,416,938 | 11/1983 | Haskell | 428/289 |
| 4,418,119 | 11/1983 | Morrow et al. | 428/342 |
| 4,439,493 | 3/1984 | Hein et al. | 428/414 |
| 4,475,241 | 10/1984 | Mueller et al. | 383/113 |
| 4,564,559 | 1/1986 | Wagner, Jr. et al. | 428/349 |
| 4,565,742 | 1/1986 | Lang | 428/476.3 |
| 4,650,721 | 3/1987 | Ashcraft et al. | 428/516 |
| 4,719,147 | 1/1988 | Mauri | 428/336 |
| 4,725,646 | 2/1988 | Kobashi et al. | 525/61 |
| 4,731,266 | 3/1988 | Bonnebat et al. | 428/35 |
| 4,770,944 | 9/1988 | Farrell et al. | 428/474.4 |
| 4,785,049 | 11/1988 | Balaba et al. | 525/61 |
| 4,816,342 | 3/1989 | Farrell et al. | 428/475.5 |
| 4,883,698 | 11/1989 | Bothe et al. | 428/35.9 |
| 4,927,689 | 5/1990 | Markiewicz | 428/34.8 |
| 4,975,315 | 12/1990 | Bothe et al. | 428/216 |
| 5,102,699 | 4/1992 | Beeson et al. | 427/379 |
| 5,151,331 | 9/1992 | Beeson et al. | 428/475.5 |
| 5,175,036 | 12/1992 | Smiley et al. | 428/36.7 |
| 5,178,960 | 1/1993 | Cook | 428/461 |
| 5,196,269 | 3/1993 | Kittrell et al. | 428/513 |
| 5,225,288 | 7/1993 | Beeson | 428/475.5 |
| 5,230,963 | 7/1993 | Knoerzer et al. | 428/520 |
| 5,252,384 | 10/1993 | Bothe et al. | 428/212 |
| 5,254,394 | 10/1993 | Bothe et al. | 428/212 |
| 5,286,424 | 2/1994 | Su et al. | 264/23 |

OXYGEN AND MOISTURE BARRIER METALLIZED FILM STRUCTURE

CROSS REFERENCE TO RELATED APPLICATIONS

This application is a continuation-in-part of commonly assigned copending U.S. application Ser. No. 08/080,602, filed Jun. 24, 1993 now U.S. Pat. No. 5,380,586 which is a continuation-in-part of U.S. application Ser. No. 08/812,493 filed Dec. 23, 1991 now abandoned.

BACKGROUND OF THE INVENTION

The present invention relates to flexible polymeric film packaging structures with improved oxygen and moisture barrier characteristics. More specifically, the invention relates to a film structure which includes a polymeric substrate, an oxygen barrier containing cross-linked polyvinyl alcohol ("PVOH") and a moisture barrier including a metallized polymeric composite.

Certain polymeric films employed for the packaging of foods inherently permit the transmission of oxygen and moisture from the outside of the film to the inside of a food package wrapped with the film. Oxygen and/or moisture permit rapid deterioration of foods packaged in polymeric films. Exclusion of oxygen and moisture from packaged foods retards product spoilage. Therefore, film structures which provide a barrier to oxygen and moisture are highly desirable food packaging materials.

Attempts have been made in the past to provide polymeric films which have high oxygen and moisture barrier. Many of the oxygen and water vapor transmission resistant films disclosed in the prior art provide films comprising polymeric substrates coated with PVOH coatings. Polyvinyl alcohols are polymers containing ($-CH_2-CHOH-$) groups. They can be applied from water solution and are in many respects attractive materials for use as barrier coatings for thermoplastic polymer substrates. When applied to thermoplastic polymer surfaces which have been treated by any of a number of means to render them receptive to coatings, polyvinyl alcohols adhere tenaciously, are flexible, clear and transparent, provide an oxygen impermeable barrier, and are resistant to permeation by greases, oils and a wide variety of common organic solvents, such as esters, ethers, ketones, hydrocarbons and chlorinated hydrocarbons.

The advantage of water solubility in the application of PVOH as a barrier coating becomes its chief drawback, however, when the barrier coating has been formed on a thermoplastic polymeric substrate. The poor water resistance of PVOH restricts its use as barrier coating to those few applications where nearly anhydrous conditions prevail. Moisture may act to cause staining or wear due to friction, an unpleasant feel to the touch and a dull appearance. It is also known that the oxygen permeability of PVOH increases in proportion to its moisture content.

A number of methods have been known for increasing the water resistance of PVOH, but none provides entirely satisfactory results. In spite of various heretofore practiced cross-linking methods, the polyvinyl alcohol still tends to soften, swell and lose adhering strength when exposed to water or even moisture vapor. Hence, barrier coatings consisting only of polyvinyl alcohol cannot be used where a substantial degree of water-resistance or moisture-proofness is required.

U.S. Pat. No. 3,282,729 to Richardson, et al., discloses thermoplastic polymer substrates coated with polyvinyl alcohol cross-linked with a trimethylolphenol compound such as 2, 4, 6-tris (hydroxymethyl) phenol. The polyvinyl alcohol and the trimethylolphenol compound are applied to the thermoplastic substrate in a water solution. The coated substrate is then cured at elevated temperature to allow the cross-linking of the two compounds with each other. To cure the PVOH coating, Richardson et al. use high temperatures for extended periods of time, providing a process that is energy intensive and thus expensive. Moreover, there is no indication in the '729 reference to use a metallized polymeric composite to enhance the moisture barrier characteristics of the packaging film.

Accordingly, there is still a need in the art of packaging films to provide a film structure which has both excellent oxygen and moisture barrier characteristics.

It is, therefore, an object of the present invention to provide a new packaging film structure which employs a cross-linked PVOH layer exhibiting both excellent oxygen barrier and moisture barrier characteristics, even in the presence of water.

SUMMARY OF THE INVENTION

The present invention, which addresses the needs of the prior art, provides packaging film structures which have both excellent oxygen and moisture barrier properties.

More specifically, it has now been found that by securing a film combination which has low oxygen transmissive properties to a moisture barrier including a metallized polymeric composite, preferably metallized polypropylene, film structures having enhanced oxygen and high moisture barrier are obtained.

The film structure having improved oxygen and moisture barrier characteristics includes a polymeric substrate adapted to receive an oxygen barrier layer by surface treating and priming of at least one side thereof. Once treated and primed, the surface of the polymeric substrate is provided with an oxygen barrier layer which includes PVOH cross-linked with a cross-linking agent in the presence of a catalytic amount of an inorganic acid, most preferably sulfuric acid. A metallized polymeric film is then laminated by adhesion or extrusion onto the outer surface of the oxygen barrier of the film structure. The adhesive is preferably polyurethane or polyethylene for extrusion lamination. The metallized polymeric film is preferably metallized oriented polypropylene. The use of metallized structures allows the packaging film structure to be printed on the oxygen barrier layer and the graphics remain well protected.

In all packaging film structures of the present invention the polymeric substrate may be oriented polyethylene terephthalate, nylon, oriented polypropylene and polyethylene. The polymeric substrate is usually surface treated by known processes, preferably corona treatment, to a surface free energy of 35 dynes/cm. or higher.

The present invention also provides a process of preparing packaging film structures having improved oxygen and moisture barrier properties. The process includes coating at least one surface of a primed, surface treated polymeric substrate with an aqueous solution of PVOH, aldehyde-containing cross-linking agent and a catalytic amount of inorganic acid, preferably sulfuric acid and allowing the polyvinyl alcohol to cross-link thus forming an oxygen barrier. The aqueous solution of PVOH includes a solid content comprising from about 62.5% to about 95% by weight of PVOH, from about 5% to about 30% by weight of cross-linking agent and up to 7.5% by weight of acid catalyst. The metallized polymeric layer which provides the moisture barrier is then secured to an outer surface of the oxygen barrier by adhesion or extrusion lamination. Packaging film structures made by the processes described above are also encompassed by the present invention.

As a result of the present invention, packaging film structures are provided which have excellent oxygen and moisture barrier characteristics. These structures have been found to be especially advantageous in medical packaging and wine bags. In the wine market, many wines are sold in bag-in-box packaging. Typically, such packaging requires two metallized polyester films, a structure which is twice as expensive as the cross-linked PVOH/metallized OPP laminates of the present invention. Thus, by using the packaging film structure of the present invention, significant manufacturing costs can be realized. Moreover, the metallized polyester film structure allows the package to be surface printed only. In the metallized/cross-linked PVOH film of the present invention, the PVOH surface is printed and then attached to the metallized film, so that the graphics remain well protected by the OPP substrate of the cross-linked PVOH combination.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

Figure 1:
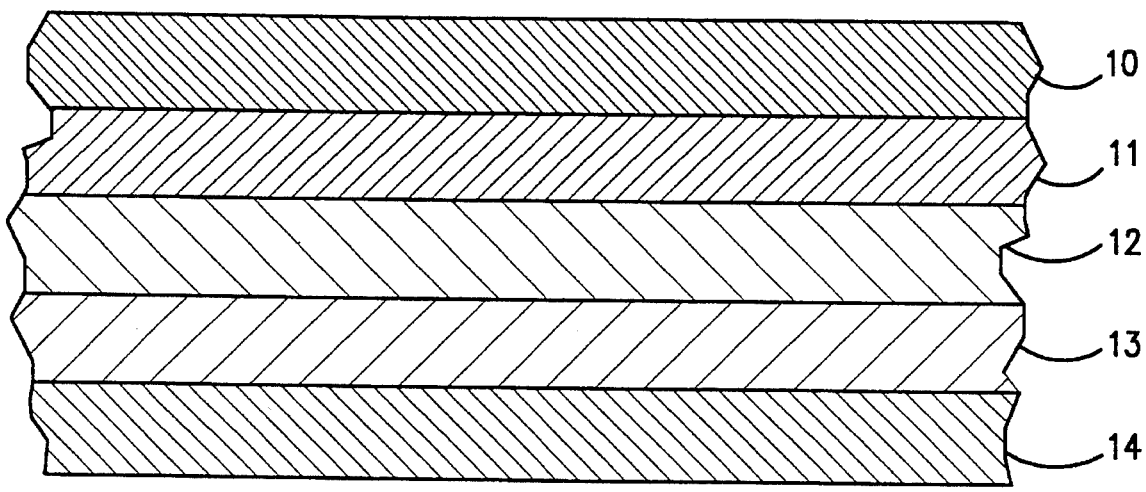
FIG. 1 shows a cross-sectional view of one embodiment of the present invention.

Certain barrier film combinations have excellent oxygen barrier properties. However, for certain commercial applications the moisture barrier properties of these film combinations can be improved. U.S. application Ser. No. 08/080,602 filed Jun. 24, 1993, incorporated herein by reference, (the "parent application") discloses excellent oxygen barrier film combinations having at least one layer of PVOH cross-linked with a cross-linking agent in the presence of a catalytic amount of sulfuric acid.

Although the resulting film combination of the parent application has excellent oxygen barrier characteristics, there are commercial applications in which it is desirable to provide a film combination exhibiting both enhanced oxygen and moisture barrier characteristics. The present application provides a metallized polymeric film structure including an oxygen barrier and a moisture barrier applied to the outer surface of the oxygen barrier. The oxygen barrier includes cross-linked PVOH and the moisture barrier is preferably metallized oriented polypropylene ("metallized OPP").

The polymeric materials contemplated as the substrate of the multilayer structure of the present invention include any polymeric film oriented or unoriented which inherently permits the transmission of oxygen and wherein the utility of such film would call for a minimization of the transmission of oxygen. In most cases, the source of the oxygen referred to herein is atmospheric oxygen. While nylon, polyethylene terephthalate ("PET"), polycarbonate films are contemplated herein, a particularly preferred class of films are the polyolefins. Within the polyolefin class, homopolymers and copolymers of propylene, low density polyethylene ("LDPE") and linear low density polyethylene ("LLDPE") are preferred. High density polyethylene ("HDPE") may also be used. Particularly preferred are isotactic polypropylenes containing at least 80% by weight of isotactic polypropylene. The preferred substrate layer can be homopolypropylene having a melting point range of from about 321° F.–336° F. A commercially available material of this description is ARCO W472 or FINA 3374 manufactured by FINA Chemical Co., Tx. The preferred substrate layer can also be coextruded with a thin skin layer, amounting to from about 2 to about 12% of the total thickness, of a copolymer of propylene and another olefin, e.g., ethylene, butene-1. The other olefin which can be present in the copolymer is in an amount of from about 1–7 wt %.

The polymeric substrate can be of any desired thickness, although thicknesses will typically range from about 0.5 to about 2 mils to ensure good machinability on high-speed packaging equipment. The OPP film should preferably have a thickness of 1.0 mil.

It has been found advantageous to treat the substrate or base layer prior to receiving the oxygen and moisture barrier layers. Such treatment enhances the adhesion of other coatings.

A preferred treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

After this treatment, a suitable primer material is coated onto the treated surface. Preferred primer materials are those disclosed in U.S. Pat. No. 4,564,559 incorporated herein by reference as if set forth in full herein. These include a primer produced by condensing a monoaldehyde with an interpolymer of acrylamide or methacrylamide and at least one other unsaturated monomer. Further included is a primer material produced by condensing aminoaldehyde with acrylamide or methacrylamide and subsequently interpolymerizing the condensation product with at least one other unsaturated monomer in the presence of a $C_1$–$C_6$ alkanol.

A particularly preferred primer material for the structure contemplated herein has been found to be poly(ethyleneimine). The imine primer provides an overall adhesively active surface for thorough and secure bonding with the subsequently applied cross-linked polyvinyl alcohol on one surface of the core substrate and the polyvinylidene chloride on the other surface of the substrate. It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin P, a product of BASF-Wyandotte Corporation.

Another particularly preferred primer material is the reaction product of an epoxy resin as a first component with an acidified aminoethylated vinyl polymer as the second component. The contemplated epoxy resins are glycidyl ethers of polyhydroxy compounds, such as resorcinol, hydroquinone, Novolac® resins, and the like.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stoichiometric equivalent balance of epoxy and amine groups. However, it has been found that the stoichiometric ratio may be varied over a wide range, from about 1 epoxy to about 3 amine groups through 3 epoxy groups to 1 amine group. Any of the above described primers can be employed in the range of about 0.001 to 3.5 $g/m^2$.

Polyvinyl alcohol ("PVOH") as used in the present invention and claims refers to a normally solid polymeric material, soluble in water, but insoluble in most organic solvents and characterized by the presence of ($-CH_2-CHOH-$) units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis PVOH thus formed and indicates the percent of hydroxyl groups present in PVOH out of the total possible hydroxyl groups. As explained hereinbelow the cross-linking reaction by which the superior barrier coatings of this invention are obtained proceeds through the hydroxyl groups of PVOH. Therefore, only substantially completely hydrolyzed PVOH are useful in this invention. By the term "substantially completely hydrolyzed" in the present specification and claims is meant a degree of hydrolysis of above about 90%. We have found that PVOH having an hydroxyl content above 98% and particularly above about 99% provide superior resistance, clarity and flexibility and adhering strength. Hydroxyl group contents of 99% to 100% provide the best barrier coatings and are particularly preferred for use in this invention.

The PVOH employed herein can be any commercially available material. For example, ELVANOL 71-30 or ELVANOL 90-30 are E. I. dupont products.

The PVOH coating solution is prepared by dissolving the polymer in hot water, cooling and mixing both with a suitable cross-linking agent and sulfuric acid as the preferred catalyst. The cross-linking agent can be a melamine or urea-formaldehyde resin. Commercially available cross-linkers also would include PAREZ 613, a methylated melamine formaldehyde; CYMEL 373, a methylated melamine formaldehyde; CYMEL 401, a trimethylol melamine urea formaldehyde; which are obtainable from American Cyanamid Corporation, glyoxal, and borax. Sulfuric acid as the cross-linker catalyst has been discovered to be far superior to nitric acid, ammonium chloride and ammonium nitrate.

Crosslinking is carried out to make the PVOH less moisture sensitive but is essential that this does not occur before the coating weight is applied and evenly distributed. This is effected by making up the aqueous solution so that the initial concentration is too low for this to occur but, as drying occurs, the concentration increases and the rate of cross-linking also increases.

Suitable concentrations have been found to be from 1 to 35 wt %, preferably from 4 to 8 wt % of the solution, which are PVOH plus cross-linking agent plus sulfuric acid in a catalytically active amount. If the solids content is higher, the solution becomes too viscous; if lower, good water resistance is not obtained. From about 5% to 30%, typically 15% cross-linking agent is used with from 0.1% to 7.5%, typically 2% of the sulfuric acid catalyst. A preferred formulation comprises the following solids content: 85.5 wt % PVOH; 12.8 wt % methylated melamine formaldehyde; and 1.7 wt % sulfuric acid. The sulfuric acid employed can have a strength ranging from about 0.1 to 20 wt. %.

Aqueous PVOH solutions were prepared by dissolving sufficient ELVANOL 71-30 in hot water to form 8 wt % solutions which were then cooled. To these solutions were added a 20 wt % aqueous melamine formaldehyde solution and the appropriate amount of aqueous ammonium chloride solutions and sulfuric acid solutions to provide the formulations shown in the Table 1 below. Cross-linked PVOH can be present in an amount from about 0.4 to 4.5 $g/m^2$.

The cross-linked PVOH coated films described above are intended to be adhesively laminated to either oriented or unoriented commercially available thermoplastic films such as homopolymer polypropylene film, polypropylene with coated layers, polypropylene with slip additives, polypropylene with coextruded layers, opaque polypropylene, polyethylene, nylon, polyethylene terephthalate, polycarbonate, polystyrene, etc. A preferred class of films are the polyolefins. Most preferred is a polymeric substrate of OPP having a thickness of 1.00 mil.

Other particularly preferred substrates to which the above cross-linked PVOH film combination is adhesively laminated are moisture barrier materials such as metallized films, preferably metallized OPP.

The metallized films useful in the present invention provide excellent moisture barrier, but inherently permit the transmission of oxygen. By laminating a cross-linked PVOH film combination to metallized film, a multi-layer film structure is obtained which has significantly enhanced oxygen and moisture barrier.

Within the metallized films class, metallized oriented polypropylene is most preferred. Commercially available metallized OPP is available from Mobil Chemical, Films Division Bicor 70MB-HB. Many commercially available metallized OPP films are composites consisting of a polypropylene core having, on at least one of its surfaces, a relatively thin layer of a propylene—ethylene copolymer. The copolymer layer is subjected to a corona discharge treatment and the coating metal is then deposited by such methods as electroplating, sputtering, or vacuum metallizing. The metal may be aluminum, copper, silver and chromium.

A preferred metallized OPP and method of manufacture is disclosed in U.S. Pat. No. 4,345,005 incorporated herein by reference.

Commercially available metallized OPP has excellent moisture barrier properties as shown by a very low water vapor transmission rate ("WVTR"), typically 0.05 gm/100 $in^2$/24 hr at 100° F., 90% relative humidity ("RH"). However, with an average oxygen transmission rate ("TO$_2$") of 2 to 5 cc/100 in$^2$/24 hr, metallized OPP does not provide adequate oxygen barrier for many applications. Thus, the combination of metallized OPP with cross-linked PVOH coated film creates a structure that provides both, excellent moisture and oxygen barrier.

Metallized films known in the art can be laminated to the cross-linked PVOH film combinations by applying an adhesive coating onto the cross-linked PVOH layer. In the present invention the adhesive bonds the metallized film onto the PVOH bearing surface of the polymeric substrate. Prior to applying the adhesive, the cross-linked PVOH layer can be ink printed. The adhesive can be any adhesive used with metallized films, polyurethane being preferred. The metallized film can also be attached to the cross-linked PVOH film combination by polymounting, i.e., extrusion lamination. Extrusion lamination is a known process for joining two webs by feeding them through a machine that extrudes a thin layer of plastic between them to act as an adhesive.

FIG. 1 illustrates an embodiment of the present invention. Layer 10 represents a surface treated polymeric substrate which is coated with a primer layer 11 on at least one surface thereof. A cross-linked PVOH layer 12 is adhered to the surface treated substrate. The cross-linked PVOH film combination is adhesively laminated to a metallized film layer 14 by applying an adhesive coating 13 onto the cross-linked PVOH bearing surface.

EXAMPLES

The following examples serve to provide further appreciation of the invention but are not meant in any way to restrict the effective scope of the invention.

treated in accordance with commonly employed prior art techniques to produce a surface with a wetting tension of about 42 dynes/cm. The treated film is precoated on both sides with 0.1 wt % poly(ethyleneimine), as manufactured by BASF-Wyandotte Corporation Polyamine P product. The film is air-dried at 100° C. This coating weight is too low to be measured, but is calculated to be in the range of 0.002 g/m$^2$. One treated and primed surface of this film structure was then coated with the appropriate solution of PVOH, cross-linking agent and catalyst. The solutions were applied utilizing a reverse direct gravure coater and the coated film is passed through a dry-air oven at from 100°–125° C. This produces a coating weight of 0.5 g/m$^2$.

The dried films were then tested in an oxygen-permeability device in which a stream of dry oxygen is passed through an aqueous salt solution-permeated pad to control the gas moisture content and then through the films, disposed at right angles to the stream with the cross-linked PVOH coating upstream. The oxygen transmitted was determined and the amount of oxygen passed per unit area of film per time period was calculated.

Samples bearing cross-linked PVOH layer obtained by using sulfuric acid catalyzed systems were superior to any other catalyzed system for inhibiting the transmission of oxygen through the packaging films. The rubbing resistance of the sulfuric acid catalyzed film combinations was also outstanding. Oxygen transmission and rubbing resistance rates for several samples bearing PVOH cross-linked in the presence of methylated melamine formaldehyde, ammonium chloride and sulfuric acid are set forth in Table 1 below.

TABLE 1

| SAMPLE CODE | CATALYST (PHR) | P 613[1] XLINK (PHR) | RUBBING[2] RESISTANCE 0 WK | 2 WK | 3 WK | TO$_2$(CC/100 IN$^2$/24 HR)[3] AT 75% RH 1 WK | APP. 50% RH 3 WK |
|---|---|---|---|---|---|---|---|
| 1 | NH$_4$Cl: 2.0 | 15 | 100 | 70 | 50 | 7.07 | 11.00 |
| 2 | NH$_4$Cl: 2.0 | 15 | 100 | 70 | 50 | 9.94 | — |
| 3 | NH$_4$Cl: 2.5 | 20 | 70 | 70 | 70 | 8.63 | — |
| 4 | (NH$_4$)$_2$SO$_4$: 1.5 | 10 | — | — | 100 | — | 8.20 |
| 5 | (NH$_4$)$_2$SO$_4$: 3.0 | 25 | — | — | 100 | — | 5.80 |
| 6 | NH$_4$NO$_3$: 1.5 | 10 | — | — | 0 | — | 5.60 |
| 7 | HNO$_3$: 1.5 | 10 | — | — | 70 | — | 9.00 |
| 8 | Nil | Nil | 100 | 100 | 100 | 4.64 | 7.03 |
| 9 | H$_2$SO$_4$: 2.0 | 15 | 50 | 30 | 0 | 4.19 | 3.53 |
| 10 | H$_2$SO$_4$: 2.0 | 25 | 50 | 50 | 0 | 4.69 | 3.86 |
| 11 | H$_2$SO$_4$: 2.0 | 20 | 50 | 30 | 0 | 3.14 | 3.24 |
| 12 | H$_2$SO$_4$: 3.0 | 20 | 10 | 0 | 0 | 1.69 | 2.78 |
| 13 | H$_2$SO$_4$: 3.0 | 25 | — | — | 0 | — | 3.10 |

[1]Parez 613, a methylated melamine formaldehyde.
[2]% of coating removed.
[3]Oxygen transmission rate.

EXAMPLE 1

A homopolymer polypropylene core layer is coextruded with skin layers of an ethylene-propylene random copolymer. The random copolymer contains approximately 3–5% by weight of ethylene. The extruded film is biaxially oriented to 4–5 times machine direction and 7–10 times transverse direction to yield a film having a thickness of approximately 1 mil. The thickness of the skin layers is approximately 12% of the film and are approximately of equal thickness. This film combination is corona discharge Table 1 illustrates that samples bearing PVOH cross-linked with sulfuric acid have oxygen transmission rate and rubbing resistance values far superior to those cross-linked with ammonium chloride.

EXAMPLE 2

A cross-linked PVOH coating was applied to a 1.00 mil OPP film, surface treated and primed as in Example 1 above. The resulting film combination was laminated onto the cross-linked PVOH bearing surface with a layer of metallized OPP. The lamination was carried out by using a coating of polyurethane adhesive over the vacuum deposited aluminum surface of the metallized OPP. The resulting structure had excellent oxygen and moisture barrier properties as illustrated in Table 2 below.

TABLE 2

| SUBSTRATE | SUBSTRATE[1] THICKNESS | BARRIER LAYER | THICKNESS OF[1] BARRIER LAYER | $TO_2$[2] | $TO_2$[3] | WVTR[4] |
|---|---|---|---|---|---|---|
| Uncoated OPP | 1.00 | — | — | >150 | >150 | 0.360 |
| Coated OPP | 1.00 | Cross-linked PVOH | 0.04 | 0.02 | 3.1 | 0.360 |
| Metallized OPP | 1.00 | — | Aluminum | 2–5 | 2–5 | 0.05 |
| Coated OPP | 1.00 | Cross-linked PVOH and Metallized OPP | 0.04 | 0.04 | 0.10 | 0.05 |

[1]The thickness is measured in mil.
[2]oxygen Transmission Rate measured in cc/100 in²/24 hr. at 75° F., 0% RH.
[3]oxygen Transmission Rate measured in cc/100 in²/24 hr. at 75° F., 75% RH.
[4]Water Vapor Transmission Rate measured in gm/100 in²/24 hr. at 100° F., 90% RH.

In Table 2, uncoated OPP shows poor oxygen barrier and moisture properties. By coating OPP with cross-linked PVOH the oxygen barrier properties of the resulting film structure increase dramatically. However, the moisture barrier properties are not enhanced. Table 2 further illustrates that a typical metallized OPP provides an excellent moisture barrier; however, with $TO_2$ values from about 2–5 cc/100 in²/24 hr the oxygen barrier properties of metallized OPP are inadequate for many applications. Consequently, when a metallized OPP layer is laminated or polymounted onto a film combination including cross-linked PVOH, the resulting structure has both excellent oxygen and moisture barrier properties.

Thus, while there have been described what are presently believed to be the preferred embodiments of the present invention, those skilled in the art will realize that other and further modifications can be made without departing from the true spirit of the invention and it is intended to include all such modifications and variations as come within the scope of the claims as set forth below.

We claim:

1. A polymeric film structure which comprises:

(I) a polymeric substrate having at least one treated surface for the receipt of an oxygen barrier coating;

(II) an oxygen barrier coating on said one treated surface of said polymeric substrate, said oxygen barrier coating comprising polyvinyl alcohol cross-linked with an cross-linking agent in the presence of sulfuric acid present in an amount sufficient to catalyze cross-linking of said polyvinyl alcohol, said coating having an outer surface opposite said polymeric substrate; and (III) a moisture barrier on said outer surface of said oxygen barrier coating, said moisture barrier comprising an oriented polyolefin layer having at least one treated surface and a metal coating thereon whereby said polymeric film structure has enhanced oxygen and moisture barrier properties.

2. The structure of claim 1, wherein said oriented polyolefin layer comprises a compound selected from the group consisting of polypropylene and polyethylene.

3. The structure of claim 1, wherein said moisture barrier is metallized oriented polypropylene.

4. The structure of claim 1, wherein said metal coating is selected from the group consisting of aluminum, copper, silver and chromium.

5. The structure of claim 1, further comprising an adhesive layer between said oxygen barrier and said moisture barrier.

6. The structure of claim 5, wherein said adhesive layer is selected from the group consisting of polyurethane and polyethylene.

7. The film structure of claim 1, wherein said polymeric substrate is selected from the group consisting of oriented polypropylene, polyethylene, polyethylene terephthalate, nylon and mixtures thereof.

8. The film structure of claim 1, wherein said cross-linking agent is selected from the group consisting of urea formaldehyde, melamine formaldehyde, methylated melamine formaldehyde, trimethylol melamine urea formaldehyde and mixtures thereof.

9. The film structure of claim 1, wherein said oxygen barrier includes from about 62.5 to about 95 by weight of said polyvinyl alcohol, and from about 5 to about 30 by weight of said cross-linking agent.

10. The film structure of claim 1, wherein said oxygen barrier layer includes from about 0.1 to about 7.5 by weight of said cross-linking agent.

11. The film structure of claim 1, wherein said polymeric substrate further comprises a coextruded propylene-ethylene copolymer skin layer on at least one surface thereof.

12. The film structure of claim 1, wherein said polymeric substrate further comprises a primer layer on at least one surface thereof, said primer selected from the group consisting of a primer produced by condensing a monoaldehyde with an interpolymer of acrylamide or methacrylamide and at least one other unsaturated monomer; a primer produced by condensing aminoaldehyde with acrylamide or methacrylamide and interpolymerizing the condensation product with another unsaturated monomer in the presence of a $C_1$–$C_6$ alkanol; poly(ethyleneimine); and the reaction product of an epoxy resin and an acidified aminoethylated vinyl polymer.

13. A polymeric film structure having improved oxygen and moisture barrier properties, produced by the following steps:

(i) coating one surface of a polymeric substrate adapted to receive an oxygen barrier coating with an aqueous solution of polyvinyl alcohol, an aldehyde-containing cross-linking agent and sulfuric acid present in an amount sufficient to catalyze cross-linking of polyvinyl alcohol;

(ii) cross-linking polyvinyl alcohol to provide said oxygen barrier coating having an outer surface opposite said polymeric substrate; and (iii) providing a moisture barrier to said outer surface of said oxygen barrier coating by adhering or extrusion laminating of metallized oriented polypropylene onto said outer surface of said oxygen barrier coating, whereby said film structure having improved oxygen and moisture barrier is obtained.

14. The film structure of claim 13, wherein said aqueous solution includes a solid content comprising from about 62.5% to about 95% by weight of said polyvinyl alcohol, from about 5% to about 30% by weight of said cross-linking agent and up to about 7.5% by weight of said acid catalyst.

15. The film structure of claim 13, wherein said polymeric substrate has been treated with surface free energy of at least 35 dynes/cm.

16. The polymeric film structure of claim 1, wherein said polymeric film structure has an oxygen transmission rate of from about 0.04 cc/100 in $^2$/24 hr. at 75° F., 0% relative humidity to about 0.10 cc/100 in $^2$/24 hr. at 75° F., 75% relative humidity.

17. The polymeric film structure of claim 1, wherein said polymeric film structure has a water vapor transmission rate of about 0.05 gm/100 in $^2$/24 hr. at 100° F., 90% relative humidity.

* * * * *